US012295083B2

(12) United States Patent
Meerbeek et al.

(10) Patent No.: US 12,295,083 B2
(45) Date of Patent: May 6, 2025

(54) METHOD AND A CONTROLLER FOR CONTROLLING A GROUP OF LIGHTING UNITS

(71) Applicant: SIGNIFY HOLDING B.V., Eindhoven (NL)

(72) Inventors: Berent Willem Meerbeek, Veldhoven (NL); Hugo José Krajnc, Eindhoven (NL); Sonia Kataria, Maarheeze (NL); Bas Driesen, Weert (NL); Bartel Marinus Van De Sluis, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 190 days.

(21) Appl. No.: 17/628,725

(22) PCT Filed: Jul. 6, 2020

(86) PCT No.: PCT/EP2020/069017
§ 371 (c)(1),
(2) Date: Jan. 20, 2022

(87) PCT Pub. No.: WO2021/013522
PCT Pub. Date: Jan. 28, 2021

(65) Prior Publication Data
US 2022/0264732 A1 Aug. 18, 2022

(30) Foreign Application Priority Data
Jul. 25, 2019 (EP) .................................... 19188354

(51) Int. Cl.
*H05B 47/19* (2020.01)
*H05B 47/155* (2020.01)
*H05B 47/17* (2020.01)

(52) U.S. Cl.
CPC ........... *H05B 47/19* (2020.01); *H05B 47/155* (2020.01); *H05B 47/17* (2020.01)

(58) Field of Classification Search
CPC ...... H05B 47/10; H05B 47/19; H05B 47/125; H05B 47/17; H05B 47/155; Y02B 20/40
See application file for complete search history.

(56) References Cited

U.S. PATENT DOCUMENTS 9,204,291 B2 12/2015 Jackson et al.
9,820,361 B1 * 11/2017 Turvy, Jr ................ H04L 12/18
(Continued)

FOREIGN PATENT DOCUMENTS

CN 104582176 A 4/2015
CN 108605400 A 9/2018
(Continued)

*Primary Examiner* — Wei (Victor) Y Chan

(57) ABSTRACT

A method of controlling a first lighting unit of a group of lighting units is disclosed. The method comprised receiving a first signal communicated between a portable device and the first lighting unit, determining a first signal strength of the received first signal, setting, if the first signal strength exceeds a threshold, the portable device to a first control mode wherein only the first lighting unit of the group of lighting units is controlled by the portable device, and setting, if the first signal strength does not exceed the threshold, the portable device to a second control mode wherein the lighting units of the group are controlled by the portable device.

18 Claims, 7 Drawing Sheets

(56) References Cited

U.S. PATENT DOCUMENTS

| | | | | |
|---|---|---|---|---|
| 9,872,362 | B2 | 1/2018 | Nolan et al. | |
| 10,039,172 | B2 | 7/2018 | Nolan et al. | |
| 10,153,913 | B1 | 12/2018 | Roquemore, III et al. | |
| 10,271,408 | B2 | 4/2019 | Knibbe | |
| 11,589,442 | B2 * | 2/2023 | Magielse | H05B 47/19 |
| 2016/0021716 | A1 * | 1/2016 | Kim | H05B 47/105<br>315/129 |
| 2016/0150624 | A1 | 5/2016 | Meerbeek et al. | |
| 2017/0038787 | A1 * | 2/2017 | Baker | H04W 4/021 |
| 2018/0359108 | A1 | 12/2018 | Roquemore, III et al. | |
| 2019/0074718 | A1 | 3/2019 | Aliakseyeu et al. | |
| 2019/0182933 | A1 * | 6/2019 | Lu | H05B 47/19 |
| 2019/0220728 | A1 * | 7/2019 | Lu | H05B 45/10 |
| 2019/0220729 | A1 * | 7/2019 | Lu | G05B 13/027 |

FOREIGN PATENT DOCUMENTS

| | | | |
|---|---|---|---|
| JP | 2014225471 | A | 12/2014 |
| JP | 2014534107 | A | 12/2014 |
| JP | 2017016868 | A | 1/2017 |
| JP | 2017509129 | A | 3/2017 |
| JP | 2018116765 | A | 7/2018 |

* cited by examiner

700

METHOD AND A CONTROLLER FOR CONTROLLING A GROUP OF LIGHTING UNITS

CROSS-REFERENCE TO PRIOR APPLICATIONS

This application is the U.S. National Phase application under 35 U.S.C. § 371 of International Application No. PCT/EP2020/069017, filed on Jul. 6, 2020, which claims the benefit of European Patent Application No. 19188354.5, filed on Jul. 25, 2019. These applications are hereby incorporated by reference herein.

FIELD OF THE INVENTION

The invention relates to a method of controlling a first lighting unit of a group of lighting units. The invention further relates to a computer program product for executing the method. The invention further relates to a controller for controlling a first lighting unit of a group of lighting units, and to a portable device comprising the controller.

BACKGROUND

Current smart lighting systems allow a user to control lighting units via different types of control interfaces. One of these control interfaces is a software application running on a smartphone, pc, tablet, etc. This provides a user a rich user interface with multiple options for lighting control. Another type of control interface uses an accessory device, such as a light switch. Such a light switch provides more limited lighting control options. For example, a light switch may comprise a limited number of buttons or other user input elements.

The number of connected lighting units in a home, or even in a room, is increasing, which results in that it becomes more cumbersome for users to control each individual lighting unit manually. User interfaces (e.g. rendered on a display of a portable device) can become complex and cluttered when all controllable devices are shown.

US 2016/0150624 A1 discloses a lighting system for controlling a lighting device by a control device. The lighting system comprises the lighting device and the control device comprising a first user interface arranged for receiving a first user input. The lighting system further comprises a proximity detector arranged for detecting proximity between the control device and the lighting device. In an embodiment, the processor is able to adjust the control parameter of the lighting device only if the control device is within a predefined proximity of the lighting device. The user interface may be further arranged for receiving another user input for adjusting the proximity range wherein the control device may control the lighting device.

US 2016/0021716 A1 discloses controlling a lighting control according to at least one of received signal strength indication (RSSI) and a preset lighting mode. Brightness or/and color temperature of the lighting device may be automatically controlled to two or more levels according to the RSSI and a user's taste.

SUMMARY OF THE INVENTION

The inventors have realized that due to the large number of controllable lighting units in in a lighting system, user interfaces to control these lighting units become more complex. The inventors have further realized that by adapting the user interface or the control functionality based on the most likely control needs of a user, the lighting control may be simplified. It is therefore an object of the present invention to provide a lighting system that simplifies control lighting units.

According to a first aspect of the present invention, the object is achieved by a method of controlling a group of lighting units, the method comprising:

receiving a first signal communicated between a portable device and a first lighting unit of the group of lighting units, determining a first signal strength of the received first signal, setting, if the first signal strength exceeds a threshold, the portable device to a first control mode wherein only the first lighting unit of the group of lighting units is controlled by the portable device, and setting, if the first signal strength does not exceed the threshold, the portable device to a second control mode wherein the lighting units of the group are controlled by the portable device.

The first signal is a signal communicated between the portable device and the first lighting unit. The first signal may be communicated from the portable device to the lighting unit, or vice versa. The method may further comprise the step of: determining if the first signal strength exceeds the threshold. If the first signal strength exceeds the threshold, the portable device is set to a first (individual) control mode wherein only the first lighting unit of the group of lighting units is controlled by the portable device. The signal strength of the received first signal may be indicative of a distance between the portable device and the lighting unit. Thus, if the portable device is located within a threshold range, it is set to the first control mode. If the signal strength does not exceed the threshold (and the portable device is outside the threshold range), the portable device is set to the second (group) control mode, wherein the lighting units of the group are controlled by the portable device. The group of lighting units may, for example, be a group of lighting units located in a space, such as a room. In other words, the portable device automatically switches between a (single) lighting unit control mode to a group control mode based on the signal strength of signals communicated between the lighting unit and the portable device. This, for example, simplifies control of the lighting units for the user, because it enables a user to bring the portable device within a (close) proximity of a lighting unit in order to control that lighting unit.

The method may further comprise:

receiving a user input indicative of a lighting control setting via the portable device, controlling, if the portable device has been set to the first control mode, the first lighting unit according to the lighting control setting, and controlling, if the portable device has been set to the second control mode, the group of lighting units according to the lighting control setting. Thus, when a user positions the portable device within the threshold range of the first lighting unit, the user can control only the first lighting unit (and no other lighting units outside the threshold range) with the portable device. If the user positions the portable device outside the threshold range of the first lighting unit, the user can control all lighting units of the group (e.g. all lighting units located in the space) with the portable device. This simplifies control of the lighting units for the user, because it enables a user to bring the portable device within a (close) proximity of a lighting unit in order to control that lighting unit.

The method may further comprise: indicating, via a user interface, a current control mode of the portable device. The user interface (e.g. a display, an indicator LED, an auditory user interface, a tactile user interface, etc.) of the portable device may be controlled to indicate which current control mode (i.e. the first or the second control mode) is active. This is beneficial, because by communicating to the user that the portable device is set to the first control mode wherein the first lighting unit is controlled, the usability of the lighting control is improved.

The portable device may comprise a display for rendering the user interface. The method may further comprise:

rendering, if the portable device has been set to the first control mode, a first user interface on the display, the first user interface being configured to receive user inputs for controlling the first lighting unit, and rendering, if the portable device has been set to the second control mode, a second user interface on the display, the second user interface being configured to receive user inputs for controlling the group of lighting units. In other words, the user interface is adapted based on the active control mode. The portable device may, for example, be a personal device such as a smartphone, a tablet pc, a pair of smart glasses, etc. This is beneficial, because it further simplifies control of the lighting units for the user.

Alternatively, the portable device may be a light switch, and the user input may be received via a button of the light switch. The user may press/touch/rotate the button of the light switch to control the light (e.g. turning the light on, off, cycling through light scenes, etc.). The light switch may comprise multiple buttons for receiving user inputs associated with different lighting control commands. When the user positions the light switch within the threshold range of the first lighting unit, the user can control the first lighting unit by pressing/touching the button. If the user positions the light switch outside the threshold range of the first lighting unit, the user can control all lighting units of the group (e.g. all lighting units located in the space) by pressing/touching the button. This is beneficial, because it enables advanced but simplified control functionality with a light switch.

The portable device may comprise an attachment means for attaching the portable device to a docking object configured to receive the portable device. The method may further comprise:

detecting if the portable device is attached to the docking object, and setting the portable device to the second control mode if the portable device is attached to the docking object. The docking object (e.g. a docking station, a wall plate, etc.) may comprise a means for receiving the portable device (e.g. a smartphone, a home remote control device, a light switch, etc.). The portable device may comprise a means for detecting if it has been attached to the docking object. Additionally or alternatively, the docking object may comprise a means for detecting if the portable device has been attached to the docking object, and the docking object may communicate a signal indicative thereof to the portable device. If the portable device has been attached to the docking object, it may be set to the second control mode (thereby potentially overruling the first control mode when the signal strength exceeds the threshold). This is beneficial, because by automatically switching to group control mode when the user attaches the light switch to the docking object, the usability of the lighting control is improved.

The light switch may further comprise one or more indicators for indicating the current control mode of the light switch. The method may further comprise: controlling the one or more indicators based on the current control mode of the light switch. The light switch may, for example, comprise one or more indicator LEDs for indicating its current control mode (e.g. the first (individual) control mode or the second (group) control mode. This is beneficial, because by communicating to the user that the portable device is set to the first control mode wherein the first lighting unit is controlled, the usability of the lighting control is improved.

The first signal may be a radio frequency signal. Alternatively, the first signal may be a different type of signal of which the received signal strength can be detected (such as an ultrasound signal, a sound signal, a light signal, a temperature signal, etc.).

The portable device may be configured for communicating via a first communication technology and a second communication technology. The first signal may be communicated via the first communication technology, and, if the portable device has been set to the first control mode, the first lighting unit may be controlled according to the lighting control setting via the first communication technology.

Alternatively, the portable device may be configured for communicating via a first communication technology and a second communication technology. The first signal may be communicated via the first communication technology, and, if the portable device has been set to the first control mode, the first lighting unit is controlled according to the lighting control setting via the second communication technology. It may be beneficial to use a first communication technology (e.g. a point-to-point communication technology) for determining the signal strength (which may be indicative of the distance) between the portable device and the first lighting unit, and the second communication technology (e.g. a (mesh) network communication technology) for controlling the first lighting unit (e.g. by communicating lighting control commands to the lighting unit), when, for example, the lighting unit is part of a network. As such, the network may be informed about the control of the first lighting unit.

If the portable device has been set to the second control mode, the first lighting unit and/or other lighting units of the group of lighting units are controlled according to the lighting control setting via the second communication technology. It may be beneficial to use for example a network communication technology (e.g. a mesh network communication technology such as Zigbee) for controlling the group of lighting units. As such, the network may be informed of the control of the first lighting unit.

The first (wireless) communication technology may be a multi-hop communication technology (such as Zigbee, Thread, WirelessHART, SmartRF, Bluetooth Mesh, WiFi Mesh, or any other mesh or tree-based technology), and the second (wireless) communication technology may be a point-to-point communication technology (such as Bluetooth, Bluetooth Low Energy (BLE), Infrared (IR), near field communication (NFC), wireless local area communication (Wi-Fi), etc.).

The lighting units of the group of lighting units may be associated with a space. The lighting units may, for example, be associated or assigned to a room (e.g. a living room, a kitchen, etc.) or a zone (e.g. upstairs, downstairs, TV area). The lighting units may have been associated with the space in a lighting control software application. Thus, when a user positions the portable device within the threshold range of the first lighting unit, the user can control only the first lighting unit (and no other lighting units outside the threshold range in the space) with the portable device. If the user positions the portable device outside the threshold range of the first lighting unit, the user can control all lighting units in the space (e.g. all lighting units located in the room) with the portable device. In other words, the portable device automatically switches between a (single) lighting unit control mode and a room control mode based on the signal strength of signals communicated between the lighting unit and the portable device.

The group of lighting units may further comprise at least one second lighting unit, and the method may further comprise:

receiving a second signal communicated between the portable device and a second lighting unit of the group of lighting units, determining a second signal strength of the received second signal, setting, if the first signal strength exceeds the threshold and the second signal strength exceeds a second threshold, the portable device to a third control mode wherein the first lighting unit and the second lighting unit of the group of lighting units are controlled by the portable device, and setting, if the first signal strength does not exceed the threshold and the second signal strength exceeds the second threshold, the portable device to a fourth control mode wherein only the second lighting unit of the group is controlled by the portable device. The group of lighting units may comprise three or more lighting units. The threshold and the second threshold may be different or (substantially) equal. If two lighting units (e.g. the first and the second lighting units) are both within threshold ranges from the portable device, the portable device may be set to the third control mode wherein both the lighting units may be controlled by the portable device. If only the second, and not the first, lighting unit is located within the threshold range, the portable device may be set to a mode wherein it controls only the second lighting unit (and not the first lighting unit or any other lighting unit from the group). If neither of the lighting units of the group of lighting units is located within a threshold range from the portable device, the portable device is set to the second control mode wherein all lighting units of the group are controlled by the portable device.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a controller for controlling a group of lighting units, the controller comprising:

a communication unit configured to receive a first signal communicated between a portable device and a first lighting unit of the group of lighting units, and a processor configured to:

- determine a first signal strength of the received first signal,
- set, if the first signal strength exceeds a threshold, the portable device to a first control mode wherein only the first lighting unit of the group of lighting units is controlled by the portable device,
- set, if the first signal strength does not exceed the threshold, the portable device to a second control mode wherein the lighting units of the group are controlled by the portable device,
- receive a user input indicative of a lighting control setting via the portable device,
- control, if the portable device has been set to the first control mode, the first lighting unit according to the lighting control setting, and
- control, if the portable device has been set to the second control mode, the group of lighting units according to the lighting control setting. The portable device may comprise the controller.

It should be understood that the computer program product and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
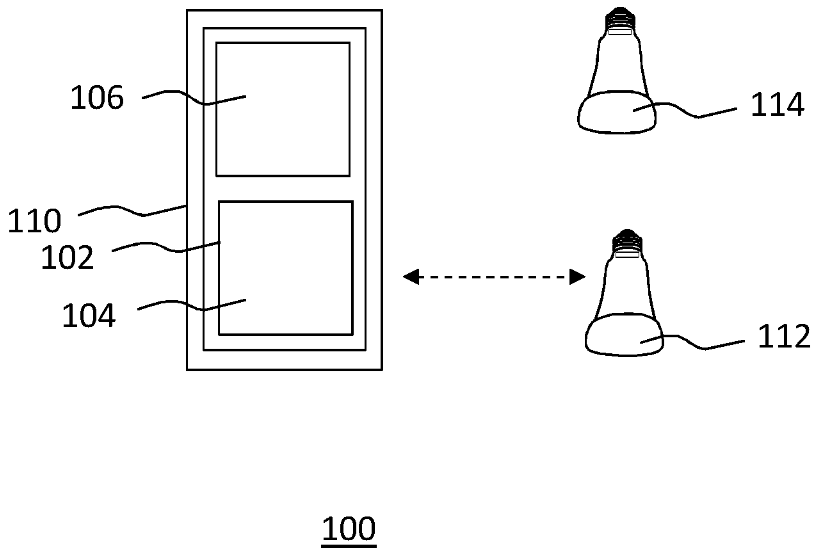
FIG. 1 shows schematically an embodiment of a system comprising a controller for controlling a plurality of lighting units.

FIG. 1 illustrates a lighting system 100 comprising a controller 102 configured to control a plurality of lighting units 112, 114. The controller 102 may be located in the same environment wherein the lighting units 112, 114 are located. The controller 102 may, for example, be comprised in a hub, a bridge or another central controller of the lighting system. In other examples, the controller 102 may be comprised in a portable user device 110 such as a smartphone, a tablet pc, a wearable device, a light switch, etc. Alternatively, the controller 102 may be comprised in a remote server, which may communicate with the lighting units 112, 114 via a network such as the internet. Alternatively, the controller 102 may be comprised in a lighting unit 112, 114. The location of the controller 102 may depend on the system architecture of the lighting system 100.

The controller 102 comprises a communication unit 104 configured to receive a first signal communicated between a portable device 110 and the first lighting unit 112. The first signal may be a signal communicated from the first lighting unit 112 to the portable device 110. A processor 106 of the portable device 110 may be configured to analyze the signal to determine its signal strength. Alternatively, the first signal may be communicated from the portable device 110 to the first lighting unit 112. The first lighting unit 112 may be configured to communicate the first signal, or an indication of its signal strength, to the controller 102, for example via a network.

The controller 102 further comprises the processor 106 (e.g. a microcontroller, circuitry, etc.). The processor 106 is configured to determine a first signal strength of the received first signal. The processor 106 may be configured to calculate the first signal strength, or it may be calculated by a further device (e.g. a remote device accessible via a network such as the internet) and it may be communicated to the processor 106. The first signal may, for example, be a radio frequency signal. Alternatively, the first signal may be a different type of signal of which the received signal strength can be detected (such as an ultrasound signal, a sound signal, a light signal, etc.). The processor 106 may analyze the first signal to determine a received signal strength indicator (RSSI) of the signal. This RSSI is a measurement of the power present in the first signal. The RSSI may be indicative of a distance between the portable device 110 and the first lighting unit 112 (the accuracy of the distance depending on environmental factors). Additionally or alternatively, the noise in the first signal (which can be seen as the deviation of RSSI over its mean) may be indicative of the signal strength and be indicative of a distance between the portable device 110 and the first lighting unit 112. If, for example, the distance between the portable device 110 and the first lighting unit 112 is smaller, the noise in signals is typically lower compared to when the distance between the portable device 110 and the first lighting unit 112 is larger. Hence, the noise in the signal (the signal to noise ratio (SNR)) may be further indicative of the distance. Techniques for determining the RSSI (and optionally the SNR) of a signal are known in the art, and it will therefore not be discussed in detail.

Figure 2A:
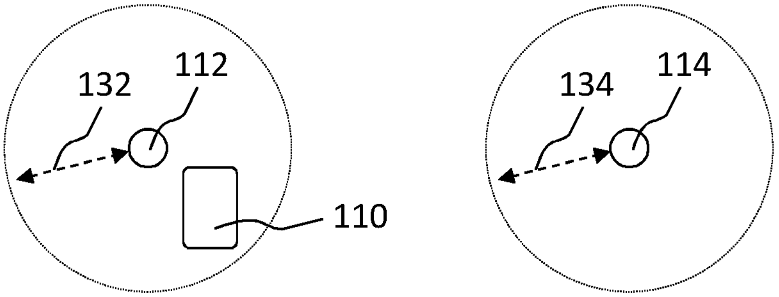
FIGS. 2*a*-2*d* show schematically exemplary embodiments wherein lighting units are controlled by a portable device based on their distance from the portable device.

The processor 106 is further configured to set, if the first signal strength exceeds a threshold, the portable device 110 to a first control mode wherein only the first lighting unit 112 of the group of lighting units 112, 114 is controlled by the portable device 110. This has been illustrated in FIG. 2*a*, wherein the portable device 110 is located relative to the lighting units 112, 114 such that signals communicated between the portable device 110 and the first lighting unit 112 are within a threshold signal strength range (indicated by arrow 132). The portable device 110 is not located within a second threshold signal strength range 134 of the second lighting unit 114. The processor 106 may therefore set the portable device 110 to the first control mode. As a result, when a user would for example provide a user input via the portable device 110, only the first lighting unit 112 (and not the second lighting unit) would be controlled by the processor 110 based on the user input.

Figure 2B:
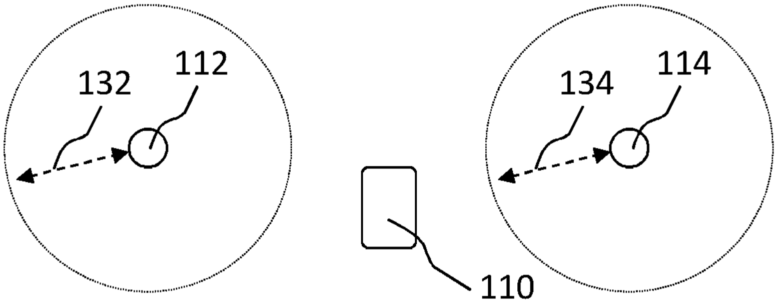

The processor 106 is further configured to set, if the first signal strength does not exceed the threshold, the portable device 110 to a second control mode wherein the lighting units 112, 114 of the group are controlled by the portable device 110. This has been illustrated in FIG. 2*b*, wherein the portable device 110 is located outside the threshold signal strength ranges 132, 134 of the first and second lighting units 112, 114. The processor 106 may therefore set the portable device 110 to the second control mode. As a result, when a user would for example provide a user input via the portable device 110, both the first lighting unit 112 and the second lighting unit would be controlled by the processor 110 based on the user input.

Figure 2C:
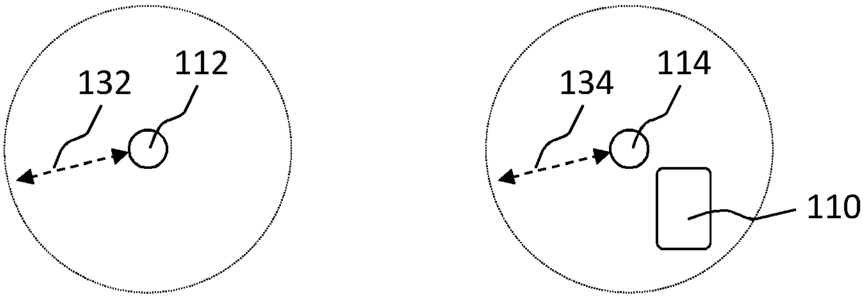

FIG. 2*c* illustrates another example, wherein the portable device 110 is located relative to the lighting units 112, 114 such that signals communicated between the portable device 110 and the second lighting unit 114 are within a threshold signal strength range 134. The portable device 110 is not located within a threshold signal strength range 132 of the first lighting unit 112. The processor 106 may therefore set the portable device 110 to a further (fourth) control mode, wherein only the second lighting unit 114 of the group is controlled by the portable device 110. As a result, when a user would for example provide a user input via the portable device 110, only the second lighting unit 114 would be controlled by the processor 110 based on the user input.

Figure 2D:
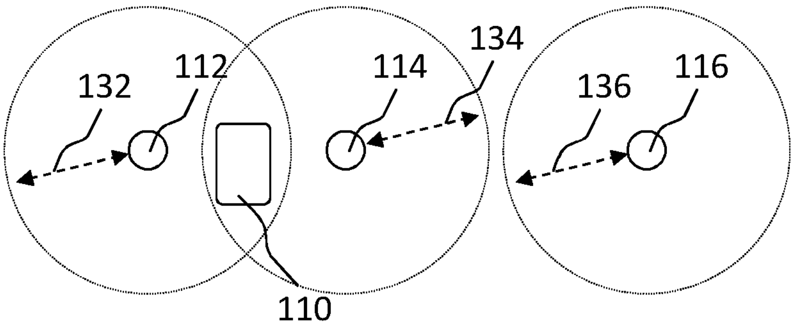

FIG. 2*d* illustrates another example, wherein the group of lighting units 112, 114, 116 further comprises a third lighting unit 116. In FIG. 2*d*, the portable device 110 is located relative to the lighting units 112, 114, 116 such that signals communicated between the portable device 110 and the first and second lighting unit 112, 114 are within respective threshold signal strength ranges 132, 134. The portable device 110 is not located within a threshold signal strength range 136 of the third lighting unit 116. The processor 106 may therefore set the portable device 110 to a further (third) control mode, wherein the first and second lighting units 112, 114 of the group are controlled by the portable device 110. As a result, when a user would for example provide a user input via the portable device 110, both the first and the second lighting units 112, 114 would be controlled by the processor 110 based on the user input.

The processor 106 may be further configured to receive the user input indicative of a lighting control setting via the portable device 110. The user input may be received via a user interface of the portable device 110. The user interface may, for example, be a touch sensitive display, and the user may for example select a light setting (e.g. a color, a light scene, an "on" or "off" setting, etc.) via the display. The user interface may, for example, be a button (e.g. a rotary button, a press/touch button, etc.), and a light setting may be associated with (each) button. The user interface may be a voice-controlled interface, and the user may select a light setting by providing a voice command (e.g. "turn the light on", "set a sunset scene", "set the light to blue", etc.), whereupon the processor 106 may control the light accordingly. Examples of user interfaces will be discussed below in more detail with reference to FIGS. 4*a*-4*c* and FIGS. 5*b* and 5*c*.

The processor 106 may be further configured to control the lighting units 112, 114 of the group based on the received user input. The processor 106 may control (only) the first lighting unit 112 according to the lighting control setting associated with the user input if the portable device 110 has been set to the first control mode, and the processor 106 may control all lighting units 112, 114 according to the lighting control setting associated with the user input if the portable device 110 has been set to the second control mode.

The communication unit 104 may further comprise a transmitter for communicating lighting control instructions to the lighting units 112, 114 to control the lighting units 112, 114 according to the lighting control setting. The lighting control instructions may relate to one or more lighting control settings, which may for instance be defined as RGB/HSL/HSB color values, CIE color values, intensity (brightness) values, beam angle/shape values, location values, etc. The lighting control instructions may be communicated (e.g. as a message) to the lighting units 112, 114 in order to control the lighting units 112, 114. Various wired and wireless communication protocols may be used, for example Ethernet, DMX, DALI, USB, Bluetooth, Wi-Fi, Li-Fi, 3G, 4G, 5G or Zigbee. A specific communication technology may be selected based on the communication capabilities of the lighting units 112, 114, the power consumption of the communication driver for the (wireless) communication technology and/or the desired communication range of the signals. If the controller 102 is comprised in a remote server, the controller 102 may be configured to control the lighting units 112, 114 via an intermediary device such as a bridge, a hub, a central (home) lighting control system, a smartphone, etc. This may depend on the system architecture of the lighting system 100.

The communication unit 104 may be configured for communicating via a plurality of communication technologies. The communication unit 104 may comprise a first communication module and a second communication module. The first communication module may be configured to communicate via a first wireless communication technology, for instance a first network technology such as BLE, and the second communication module may be configured to communicate via a second wireless communication technology, for instance a second network technology such as Zigbee. These communication modules may be separate units (e.g. separate radio chips) comprised in the portable device, or both be comprised on a single radio chip, allowing a low-cost device to operate as part of both a first network and a second network at the same time, leveraging a single wireless radio module. This may be achieved by fast switching the first and second communication technology (e.g. Zigbee and BLE) operations over time such that the device remains connected and operates in both networks simultaneously. The possibility of having a constrained device operating simultaneously on two networks opens up new solutions to improve the limitations of these existing technologies. BLE, for instance, is a low-power/low-cost wireless network technology enabling single-hop communication in a star topology between a master node and a limited number of power-constrained slave nodes. BLE provides energy-efficient connectivity between power-constrained slave devices and a less power-constrained master device. An example of a BLE network may consist of a mobile telephone device as master, which can provide Internet connectivity to an ecosystem of resource constrained devices such as sensors, wearables, and building automation devices. In the following examples, a BLE and Zigbee combined radio is used. However, the present invention is equally applicable to any other combination of wireless communication technologies (e.g. BLE, Infrared (IR), near field communication (NFC), wireless local area communication (Wi-Fi), Zigbee, Thread, WirelessHART, SmartRF, Zwave, etc.).

The first signal may be communicated via the first communication technology (e.g. BLE) between the personal device 110 and the first lighting unit 112. If the portable device 110 has been set to the first control mode by the processor 106, the first lighting unit 112 may be controlled according to the lighting control setting via the first communication technology (e.g. BLE). Alternatively, the first lighting unit 112 may be controlled according to the lighting control setting via the second communication technology (e.g. Zigbee). It may be beneficial to use a first communication technology (e.g. a point-to-point communication technology) for determining the signal strength (indicative of the distance) between the portable device and the first lighting unit, and the second communication technology (e.g. a (mesh) network communication technology) for controlling the first lighting unit (e.g. by communicating lighting control commands to the lighting unit), when, for example, the lighting units are controlled via a network, for example via a central control device such as a bridge. Additionally, the processor 106 may control the first lighting unit 112 and other lighting units 114, 116 of the group of lighting units according to the lighting control setting via the second communication technology, when the portable device 110 has been set to the second (group) control mode.

Figure 3:
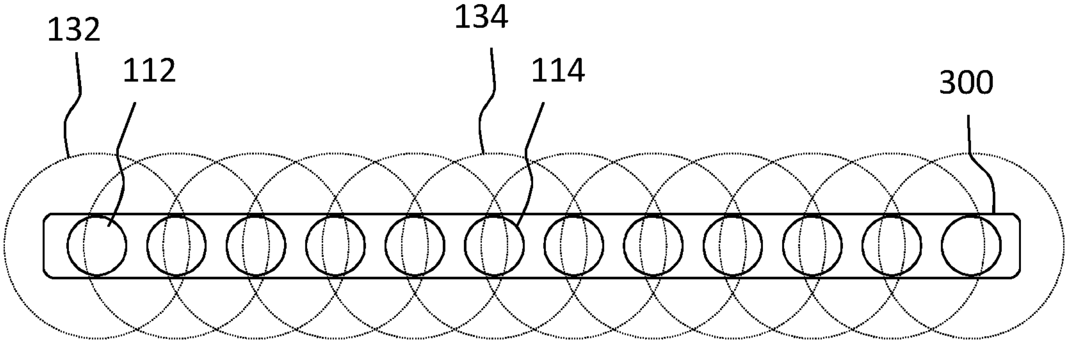
FIG. 3 shows an LED strip comprising a plurality of individually controllable lighting units.

The lighting units 112, 114 may be configured to receive lighting control instructions from the controller 102, either directly (e.g. via BLE, WiFi, Zigbee, etc.) or indirectly (e.g. via a (mesh) network). The lighting units 112, 114 may comprise one or more light sources (e.g. LED/OLED light sources). The lighting units 112, 114 may be arranged for providing general lighting, task lighting, ambient lighting, atmosphere lighting, accent lighting, indoor lighting, outdoor lighting, etc. The lighting units 112, 114 may be installed in a luminaire or in a lighting fixture. 114 The lighting units 112, 114 may be portable lighting units (e.g. a hand-sized device, such as an LED cube, an LED sphere, an object/animal shaped lighting unit, etc.) or wearable lighting units (e.g. a light bracelet, a light necklace, etc.). The lighting units 112, 114 may be individually addressable and/or individually controllable light sources of a luminaire (e.g. a light source array, an LED strip, etc.). An example of such a luminaire 300 has been illustrated in FIG. 3, wherein multiple lighting units are comprised in the luminaire 300 (e.g. an LED strip). In FIG. 3, reference numerals have only been added to two lighting units 112, 114 and to two signal strength threshold ranges 132, 134.

Figure 4A:
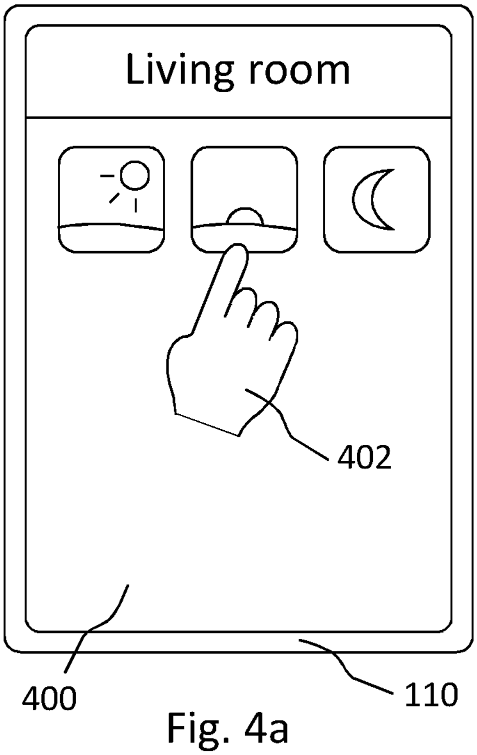
FIGS. 4*a*-4*c* show schematically exemplary embodiments of user interfaces for controlling lighting units.
Figure 4B:
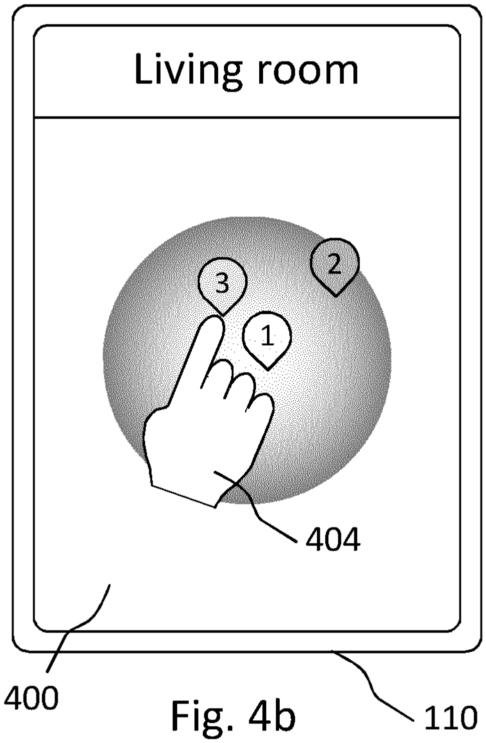
Figure 4C:
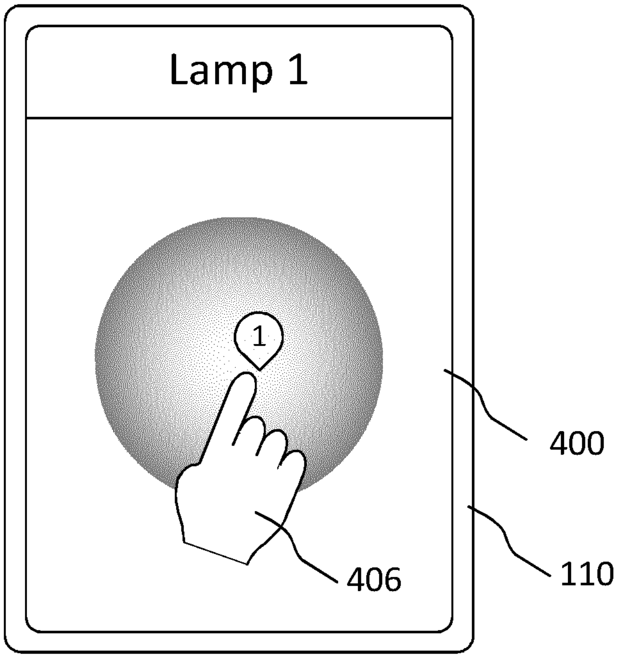

The processor 106 may be further configured to indicate a current mode of the portable device 110 via a user interface of the portable device. An example has been illustrated in FIGS. 4*a*-4*c*. These figures illustrate a portable device 110 (e.g. a smartphone, a smart watch, a tablet pc, etc.) comprising a touch sensitive display 400. FIGS. 4*a* and 4*b* illustrate a user interface that is being rendered when the second (group) control mode is active. FIG. 4*c* illustrates a user interface that is being rendered when the first (individual) control mode is active. The user interface of FIG. 4*c* enables a user to control only the first lighting unit 112 ("lamp 1"), by providing the user input 406 and picking a color for lamp 1 in the color wheel rendered on the display 400. This user interface is activated by the processor 106 when the received signal strength of the first signal exceeds the first threshold (see FIG. 2*a*). The user interface of FIGS. 4*a* and 4*b* enable a user to control the group of lighting units 112, 114, 116 by providing a user input 402 and selecting a light scene (e.g. a daylight setting, a sunset setting, a night setting) for the lamps of the group (FIG. 4*a*) or by providing a user input 404 and picking colors for the lamps of the group (lamps 1, 2 and 3) from the color wheel rendered on the display 400, as illustrated in FIG. 4*b*. The user interface of FIG. 4*a* or 4*b* is activated by the processor 106 when the received signal strength of the first signal does not exceed the first threshold (or any other threshold) (see FIG. 2*b*).

The portable device 110 may be a light switch. The light switch may comprise one or more buttons (e.g. push buttons, touch sensitive buttons, rotary buttons, etc.) for controlling the light output of the group of lighting units 112, 114. The buttons may, for example, be configured to receive user inputs for switching the light on/off, selecting light settings or scenes (e.g. by cycling through them by subsequentially actuating a button, or by rotating a rotary button), dimming the light, etc.

Figure 5A:
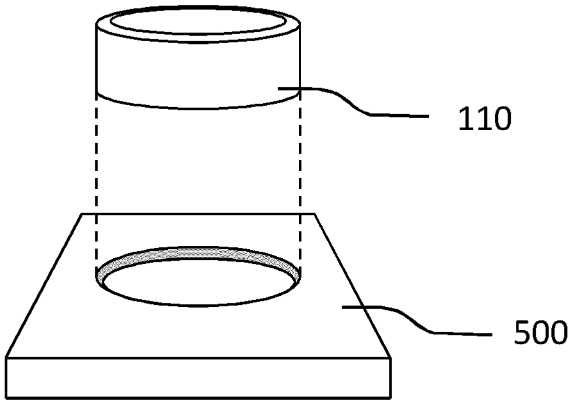
FIGS. 5*a*-5*c* show schematically exemplary embodiments of a light switch comprising a button.
Figure 5B:
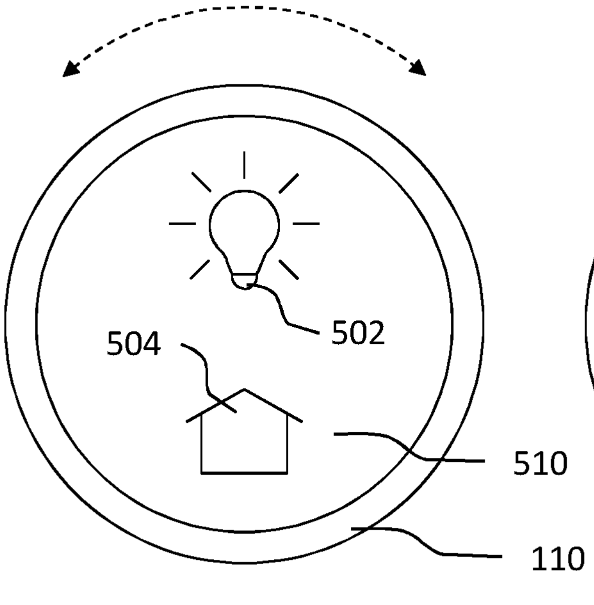
Figure 5C:
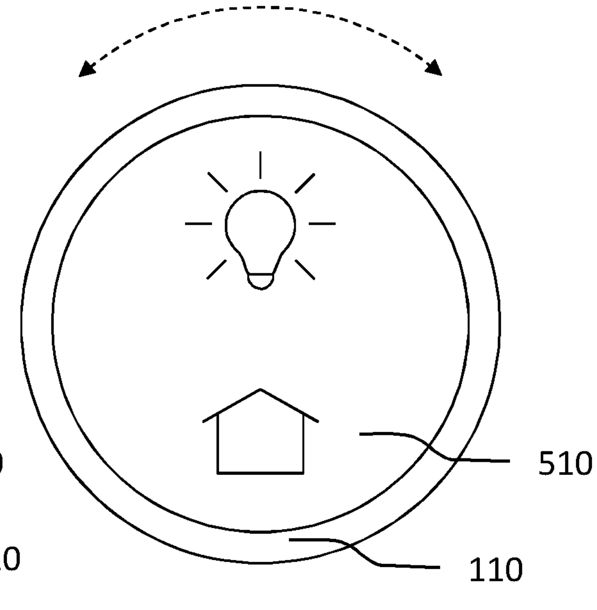

The light switch may further comprise one or more indicators (e.g. LED indicator lights, vibration motor, speaker) for indicating the current control mode of the light switch. The processor 106 may be further configured to control the one or more indicators based on the current control mode of the light switch. FIGS. 5*b* and 5*c* illustrate a light switch 110 that comprises two indicator lights below the surface of a button 510. The light switch 110 comprises a first icon 502 and a second icon 504 of transparent material for indicating the current state when the respective indicator light is switched on. FIG. 5*a* shows an example wherein the first (individual) control mode is active, and FIG. 5*b* shows an example wherein the second (group) control mode is active.

The one or more buttons of the light switch may be associated with lighting control settings. The lighting control setting may be dependent on the current state of the lighting unit. If, for example, the light switch has been set to the first (individual) control mode, the processor 106 controls the first lighting unit 112 based on an actuation of a button of the light switch. A user may, for example, press button 510 to switch the first lighting unit 112 on. If, for example, the light switch has been set to the second (group) control mode, the processor 106 controls the lighting units 112, 114 of the group based on an actuation of a button of the light switch. A user may, for example, press button 510 to switch the lighting units of the groups on. Additionally or alternatively, the button may be a rotary button. If, for example, the light switch has been set to the first (individual) control mode, a user may, for example, rotate the rotary button to dim the light output of the first lighting unit 112. If, for example, the light switch has been set to the second (group) control mode, a user may, for example, rotate the rotary button to dim the light output of the group of lighting units 112, 114. In the previous examples, the lighting control setting(s) associated with the button(s) are the same for different control modes. Alternatively, the lighting control settings associated with one or more buttons of the light switch may depend on the control mode of the light switch, and may differ per control mode. If, for example, the light switch has been set to the first (individual) control mode, a user may, for example, rotate a rotary button to pick a color for the first lighting unit 112, and if the light switch has been set to the second (group) control mode, a user may, for example, rotate the rotary button to dim the light output of the group of lighting units 112, 114. This enables the user to first set light settings for individual lamps using a button, and then control the whole group with the same button.

The portable device 110 (e.g. the light switch) may further comprise an attachment means for attaching the portable device 110 to a docking object 500 (e.g. a docking station, a wall plate, etc., see FIG. 5*a*). configured to receive the portable device 110. The attachment means may, for example, be a magnet, a snapping means, an adhesive means, etc. Such attachment means are known in the art and will therefore not be discussed in detail. The processor 106 may be further configured to detect if the portable device 110 is attached to the docking object 500, and set the portable device 110 to the second control mode if the portable device 110 is attached to the docking object 500. Additionally or alternatively, the docking object 500 may comprise a means for detecting if the portable device 110 has been attached to the docking object 500, and the docking object may communicate a signal indicative thereof to the portable device 110. The detection may be based on the presence of a magnetic field (caused by one or more magnets comprised in the portable device 110 and/or the docking object 500), based on a signal from a light sensor located at the attachment side of the portable device 110 (the signal indicating a change of light indicative of that the portable device 110 has been attached to the docking object 500), based on a signal from a button that is pressed when the portable device 110 is attached to the docking object 500, etc. Thus, if the portable device 110 has been attached to the docking object 500, it may be set to the second control mode (thereby potentially overruling the first control mode when the signal strength exceeds the threshold).

The lighting units 112, 114 of the group of lighting units may be associated with a space. The lighting units 112, 114 may, for example, be associated or assigned to a room (e.g. a living room (see FIGS. 4*a* and 4*b*), a kitchen, etc.). The lighting units 112, 114 may have been associated with the space in a lighting control software application. Thus, when a user positions the portable device 110 within the threshold range of the first lighting unit 112, the user can control only the first lighting unit 112 (and no other lighting units outside the threshold range in the space) with the portable device 110. If the user positions the portable device 110 outside the threshold range of the first lighting unit, the user can control all lighting units 112, 114 in the space (e.g. all lighting units located in the room) with the portable device 110.

The threshold may be based on a user preference. A user may for example set the threshold via a user interface (e.g. by selecting a threshold range/distance wherein when the portable device 110 is located within that threshold range, it is set to the first control mode). The threshold may, for example, be set via a slider on a touch sensitive display. Alternatively, the threshold may be set by setting a distance (e.g. 30 cm, 50 cm, 1 m, etc.) via the user interface (e.g. via a touch sensitive display, by providing a voice input, etc.).

Additionally or alternatively, the threshold may be based on one or more characteristics of the lighting unit 112, 114. The characteristics may, for example, relate to the position of the lighting unit, the type of the lighting unit, the light rendering capabilities of the lighting unit, etc. In a first example, a characteristic may relate to the type of lighting unit. A ceiling luminaire may, for example, have a larger threshold range compared to a desk lamp, or an LED strip with individually addressable lighting units may have smaller threshold ranges for the individually addressable lighting units compared to a desk lamp. In another example, a characteristic may relate to the position of a respective lighting unit relative to the space. A lighting unit located on the ceiling may, for example, have a larger threshold range compared to a lamp located on the floor. In another example, a characteristic may, for example, relate to the position of a respective lighting unit relative to another lighting unit. If, for example, lighting units are located closer to each other, their threshold ranges may be smaller, whereas if lighting units are located less close to each other, their threshold ranges may be larger. Techniques for determining positions of lighting units relative to a space or relative to each other are known in the art and will therefore not be discussed in detail.

Additionally or alternatively, the threshold may be based on historical control events or historical usage of the lighting system. The processor 106 may be further configured to identify patterns by monitoring control of the lighting system, determine signal strengths each time a user controls the lighting units 112, 114 with a portable device 110, and set the threshold for lighting control based on the historical control and the signal strengths. The threshold of the signal strength for switching from the first mode to the second mode may, for example, be an average of the (historical) signal strengths. As such, the processor 106 may learn the threshold.

Figure 6:
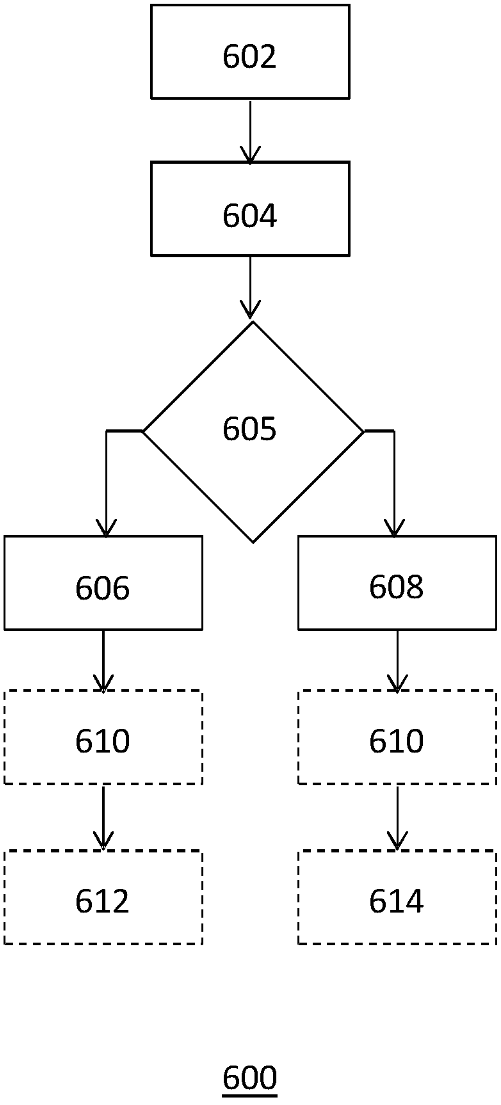
FIG. 6 shows schematically a method of controlling a first lighting unit of a group of lighting units.

FIG. 6 shows schematically a method 600 of controlling a first lighting unit 112 of a group of lighting units 112, 114. The method 600 comprises receiving 602 a first signal communicated between a portable device 110 and the first lighting unit 112, determining 604 a first signal strength of the received first signal. The method comprises determining 605 if the first signal strength exceeds a threshold. The method further comprises setting 606, if the first signal strength exceeds the threshold, the portable device 110 to a first control mode wherein only the first lighting unit 112 of the group of lighting units 112, 114 is controlled by the portable device 110, or setting 608, if the first signal strength does not exceed the threshold, the portable device 1110 to a second control mode wherein the lighting units 112, 114 of the group are controlled by the portable device 110. The method further comprises receiving a user input 110 indicative of a lighting control setting via the portable device 110, and controlling 612, if the portable device 110 has been set to the first control mode, the first lighting unit 112 according to the lighting control setting, or controlling 614, if the portable device 110 has been set to the second control mode, the group of lighting units 112, 114 according to the lighting control setting.

Figure 7:
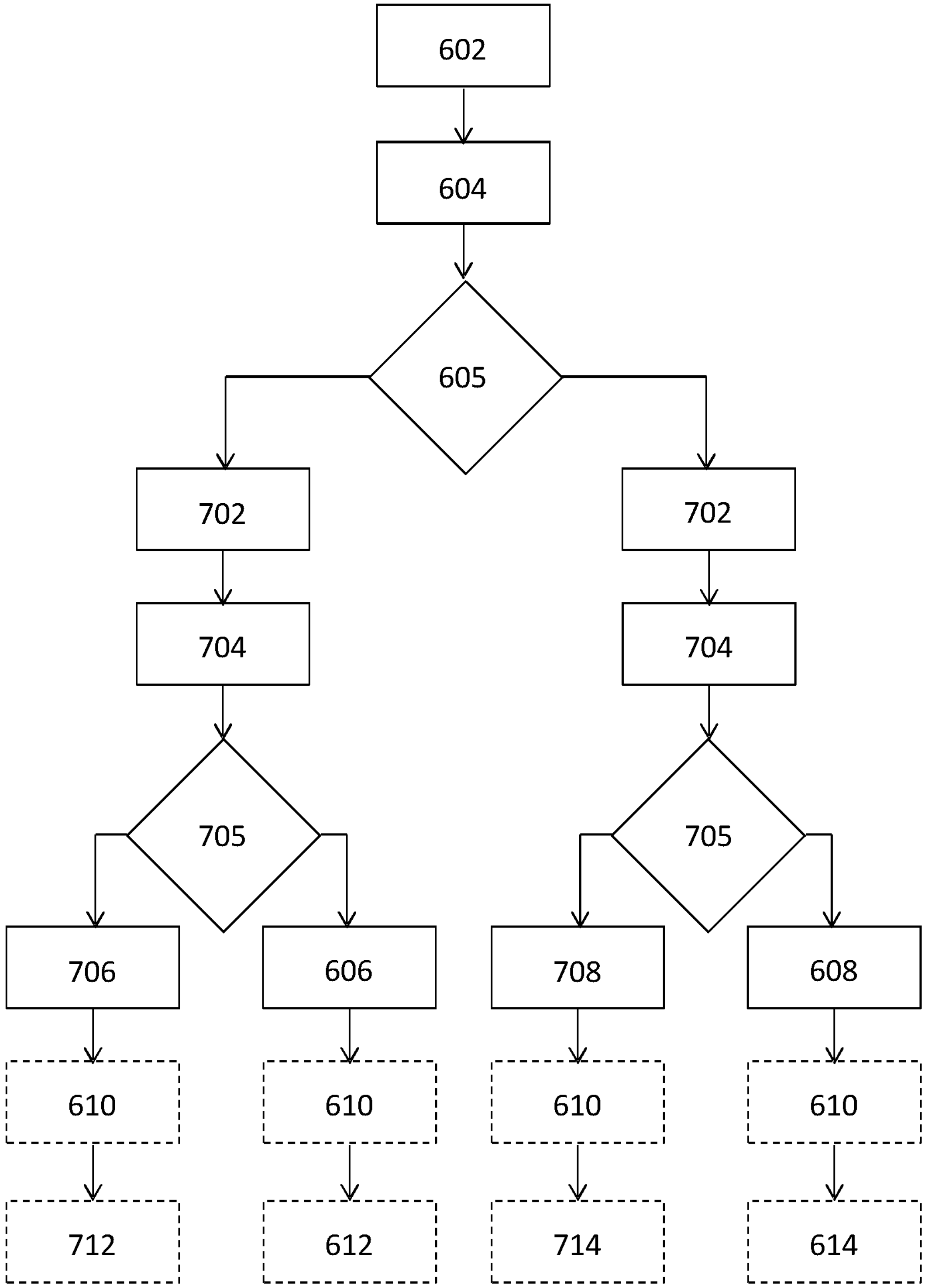
FIG. 7 shows schematically a method of controlling a plurality of lighting units of a group of lighting units.

FIG. 7 shows schematically the method of FIG. 6 including additional steps. The method 700 additionally comprises receiving 702 a second signal communicated between the portable device 110 and a second lighting unit 114 of the group of lighting units 112, 114, and determining 704 a second signal strength of the received second signal. The method comprises determining 705 if the second signal strength exceeds a second threshold. The steps of receiving 702, determining 704 and determining 705 are illustrated in FIG. 7 after the step of determining 605 if the first signal strength exceeds a threshold. It should be understood that the steps of receiving 702, determining 704 and determining 705 may occur before or during steps 602, 604 and 605.

The method comprises setting 706, if the first signal strength exceeds the threshold and the second signal strength exceeds a second threshold, the portable device 110 to a third control mode wherein the first lighting unit 112 and the second lighting unit 114 of the group of lighting units 112, 114 are controlled by the portable device 110, and controlling 712 the first lighting unit 112 and the second lighting unit 114 according to the lighting control setting.

The method comprises setting 606, if the first signal strength exceeds the threshold and the second signal strength does not exceeds a second threshold, the portable device 110 to the first control mode, and controlling 612 the first lighting unit 112 according to the lighting control setting.

The method 700 comprises setting 708, if the first signal strength does not exceed the threshold and the second signal strength exceeds the second threshold, the portable device 110 to a fourth control mode wherein only the second lighting unit 114 of the group is controlled by the portable device 110, and controlling 714 the second lighting unit 114 according to the lighting control setting.

The method 700 comprises setting 608, if neither the first signal strength exceeds the threshold nor the second signal strength exceeds the second threshold, the portable device 110 to the second control mode, and controlling 614 the first lighting unit 112 and the second lighting unit 114 according to the lighting control setting.

The methods 600, 700 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

What is claimed is:

1. A method of controlling a group of lighting units, the method comprising:
- receiving a first signal communicated between a portable device and a first lighting unit of the group of lighting units,
- determining a first signal strength of the received first signal,
- setting, if the first signal strength exceeds a threshold, the portable device to a first control mode wherein only the first lighting unit of the group of lighting units is controlled by the portable device, and
- setting, if the first signal strength does not exceed the threshold, the portable device to a second control mode wherein the lighting units of the group are controlled by the portable device, wherein the portable device comprises an attachment means for attaching the portable device to a docking object configured to receive the portable device, and wherein the method comprises:
- detecting if the portable device is attached to the docking object, and
- setting the portable device to the second control mode if the portable device is attached to the docking object.

2. The method of claim 1, further comprising:
- receiving a user input indicative of a lighting control setting via the portable device,
- controlling, if the portable device has been set to the first control mode, the first lighting unit according to the lighting control setting, and controlling, if the portable device has been set to the second control mode, the group of lighting units according to the lighting control setting.

3. The method of claim 1, wherein the method further comprises:

indicating, via a user interface, a current control mode of the portable device.

4. The method of claim 3, wherein the portable device comprises a display for rendering the user interface, wherein the method further comprises:

rendering, if the portable device has been set to the first control mode, a first user interface on the display, the first user interface being configured to receive user inputs for controlling the first lighting unit, and rendering, if the portable device has been set to the second control mode, a second user interface on the display, the second user interface being configured to receive user inputs for controlling the group of lighting units.

5. The method of claim 2, wherein the portable device is a light switch, and wherein the user input is received via a button of the light switch.

6. The method of claim 1, wherein the first signal is a radio frequency signal.

7. The method of claim 1, wherein the portable device is configured for communicating via a first communication technology and a second communication technology, and wherein the first signal is communicated via the first communication technology, and wherein, if the portable device has been set to the first control mode, the first lighting unit is controlled according to the lighting control setting via the first communication technology.

8. The method of claim 1, wherein the portable device is configured for communicating via a first communication technology and a second communication technology, and wherein the first signal is communicated via the first communication technology, and wherein, if the portable device has been set to the first control mode, the first lighting unit is controlled according to the lighting control setting via the second communication technology.

9. The method of claim 7, wherein, if the portable device has been set to the second control mode, the first lighting unit and/or other lighting units of the group of lighting units are controlled according to the lighting control setting via the second communication technology.

10. The method of claim 1, wherein the lighting units of the group of lighting units are associated with a space.

11. The method of claim 1, wherein the group of lighting units further comprises at least one second lighting unit, the method further comprising:

receiving a second signal communicated between the portable device and a second lighting unit of the group of lighting units, determining a second signal strength of the received second signal, setting, if the first signal strength exceeds the threshold and the second signal strength exceeds a second threshold, the portable device to a third control mode wherein the first lighting unit and the second lighting unit of the group of lighting units are controlled by the portable device, setting, if the first signal strength does not exceed the threshold and the second signal strength exceeds the second threshold, the portable device to a fourth control mode wherein only the second lighting unit of the group is controlled by the portable device.

12. A portable device for controlling a group of lighting units, the controller comprising:

an attachment means for attaching the portable device to a docking object configured to receive the portable device;

a communication unit configured to receive a first signal communicated between the portable device and a first lighting unit of the group of lighting units, and a processor configured to:

determine a first signal strength of the received first signal, set, if the portable device is not attached to the docking object and the first signal strength exceeds a threshold, the portable device to a first control mode wherein only the first lighting unit of the group of lighting units is controlled by the portable device, set, if the portable device is not attached to the docking object and the first signal strength does not exceed the threshold, the portable device to a second control mode wherein the lighting units of the group are controlled by the portable device, and set, if the portable device is attached to the docking object, the portable device to the second control mode.

13. A portable device for controlling a group of lighting units, the controller comprising:

an attachment means for attaching the portable device to a docking object configured to receive the portable device; and a communication unit configured to receive a first signal communicated between the portable device and a first lighting unit of the group of lighting units, and a processor configured to:

detect if the portable device is attached to the docking object, set, if the portable device is attached to the docking object, the portable device to the second control mode wherein the lighting units of the group are controlled by the portable device, and set, if the portable device is not attached to the docking object and the first signal strength exceeds a threshold, the portable device to a first control mode wherein only the first lighting unit of the group of lighting units is controlled by the portable device.

14. The portable device of claim 13, wherein the portable device is a light switch.

15. The portable device of claim 13, wherein the first signal is a radio frequency signal.

16. The portable device of claim 13, wherein the lighting units of the group of lighting units are associated with a space.

17. The portable device of claim 13, wherein the portable device is configured for communicating via a first communication technology and a second communication technology, and wherein the first signal is communicated via the first communication technology, and wherein, if the portable device has been set to the first control mode, the first lighting unit is controlled according to the lighting control setting via the first communication technology.

18. The portable device of claim 13, wherein the portable device is configured for communicating via a first communication technology and a second communication technology, and wherein the first signal is communicated via the first communication technology, and wherein, if the portable device has been set to the first control mode, the first lighting unit is controlled according to the lighting control setting via the second communication technology.

* * * * *